United States Patent [19]

Nishii

[11] Patent Number: 4,865,394
[45] Date of Patent: Sep. 12, 1989

[54] STRAIGHT AIR BRAKE CONTROL SYSTEM

[75] Inventor: Hiroshi Nishii, Kobe, Japan

[73] Assignee: Nippon Air Brake Co., Ltd., Kobe, Japan

[21] Appl. No.: 231,104

[22] Filed: Aug. 11, 1988

[30] Foreign Application Priority Data

Aug. 19, 1987 [JP] Japan .......................... 62-125886[U]

[51] Int. Cl.$^4$ ............................................ B60T 13/66
[52] U.S. Cl. ........................................ 303/20; 303/29
[58] Field of Search ................... 303/3, 15, 20, 25, 28, 303/29

[56] References Cited

U.S. PATENT DOCUMENTS 4,639,047  1/1987  Imanaka ........................... 303/20 X Primary Examiner—Duane A. Reger
Attorney, Agent, or Firm—J. B. Sotak

[57] ABSTRACT

An electromagnetic straight air brake equipment, especially to an air brake command system for railway vehicles for controlling the brake pipe pressure by employing an electric brake command type brake controller and electropneumatic convertor valve arrangement. This invention makes it possible to assemble the brake controller and the master controller into one handle, and requires no pneumatic piping leading to the operator's cab since the pneumatic apparatus is all located beneath the floor of the railway vehicle.

4 Claims, 1 Drawing Sheet

STRAIGHT AIR BRAKE CONTROL SYSTEM

FIELD OF THE INVENTION

This invention relates to an electromagnetic direct connecting or straight air brake system for a railroad car and, more particularly, to the improvement of the air brake command mechanism which pressurizes and/or exhausts the air pressure in the control line of the braking system of a railway vehicle.

BACKGROUND OF THE INVENTION

A prior art air brake system of this type is shown and disclosed in Japanese Pat. No. 45-6082.

Such a prior art air brake system is shown and will be explained hereinafter with reference to FIG. 2.

As shown in FIG. 2, a brake valve BV is conveniently located in the cab of the locomotive or lead railway car with easy reach of the motorman. The other parts or components of the system, such as, the electromagnetic direct connecting controller MSC, the electromagnetic brake valve BMV, the electromagnetic release valve RMV, the relay valve RV, the brake cylinder BC, and any other equipment are usually located underneath the floor of the railway car.

In viewing FIG. 2, it will be appreciated that the brake valve BV is in the release position and the brake cylinder BC is in an exhausted condition. In this release state, the control pipe or line CP is exhausted by the brake valve BV so that it is at atmospheric pressure. Thus, the movable linkage ML of the electromagnetic direct connecting controller MSC, which is connected to the diaphragms D4 and D5, is moved to the left by the bias return spring SP, as shown in FIG. 2. Accordingly, the release application contact point S1 is closed, while the brake application contact point S2 is opened.

Because the brake application contact point S2 is opened, the brake command line BS is disconnected from the power source E. Thus, the electromagnetic brake valve BMV deenergizes and its valve is seated and closed, so that the direct connecting line SAP is blocked off from the main air supply or reservoir line or pipe MRP. However, since the release application contact point S1 is closed, the release command line RS is connected to the power source E. Thus, the electromagnetic release valve RMV is energized and its valve is opened, so that the direct connecting line SAP is exhausted to atmospheric pressure.

Therefore, the air supply valve ASV of relay valve RV is closed, and also the hollow exhaust valve rod EVL moves downward, as viewed in FIG. 2, and exhausts the brake cylinder BC.

Now, when the brake valve BV is operated in brake application position, the control line CP is pressurized to an amount according to the selected brake operation position. Thus, the pressure on the left side of diaphragm D4 overcomes the biasing force of the return spring SP and moves the movable linkage ML to the right, as shown in FIG. 2. The movement of the movable linkage causes the release application contact point S1 to initially open, so that the release electromagnetic valve RMV is deenergized and its valve is seated and closed. This causes the direct connecting line SAP to become shut off to the atmosphere.

Next, as the movable linkage ML moves further to the right, the brake application contact point S2 will assume a closed position. The closing of point S2 causes the brake electromagnetic valve BMV to become energized and its valve is opened. Thus, air pressure is supplied from the original air reservoir line MRP to the direct connecting line SAP.

Since the direct connecting line SAP is now pressurized, the exhaust valve rod EVL of the relay valve RV moves upward and causes the air supply valve ASV to open. Thus, air pressure from the air reservoir AR is supplied to the brake cylinder BC to apply the brakes.

In addition, since the direct connecting line SAP is pressurized, the movable linkage ML is slightly moved back to the left. Now, when the respective forces on diaphragms D4 and D5 are balanced, the movable linkage causes the brake application contact point S2 to be opened. Because of this, the electromagnetic brake valve BMV is deenergized and its valve closes. Thus, no further pressurization of the direct connecting line SAP occurs. At this time, the release application contact point S1 is still opened. Therefore, the air pressure in the direct connecting line SAP remains the same at this time, while the relay valve RV also maintains pressure constant in the brake cylinder BC. This brake operating status is generally called a lap condition.

In this lap condition, the brake valve BV is operated to a low notch brake position from its release operation, so that the control line CP is pressurized according to the particular brake notch position. Thus, the movable linkage ML moves to the left so that the release application contact point S1 is closed and the electromagnetic release valve RMV is energized and its valve is opened, so that the direct connecting line SAP is exhausted. Since the direct connecting line SAP begins to exhaust, the movable linkage ML moves to the right so that the release application contact point S1 is opened. Thus, electromagnetic release valve RMV is deenergized and its valve is closed, so that the exhausting of the direct connecting line SAP is stopped and it assumes a lap condition, as described above.

At this time, the relay valve RV is exhausted to a corresponding pressure with the direct connecting or straight air line SAP, so that the brake cylinder BC is also pressurized as a function of the brake position after the above-mentioned release operation.

Following this, the brake valve BV is operated to the release position, each structural component returns to the release state, as shown in FIG. 2.

As shown, in FIG. 2, a pressure regulating valve PRV and a check valve CHV are connectable to exhaust exit port EX via the brake valve BV.

The above-mentioned embodiment of a prior art system is constructed so that the pressure in the control line CP is pressurized or exhausted by the brake valve BV at the motorman's cab, and the air brake apparatus underneath the car floor is operated in response to the pressure of this control line CP. Therefore, the brake line BP is connected to the control line CP which is connected to the electromagnetic direct connecting controller MSC, and the first air supply line P1 is connected to the main air reservoir line MRP while the second air supply line P2 is connected to the pressure regulating valve PRV, and the exhaust line P3 is open to the atmosphere.

However, it will be appreciated that it is necessary to provide sufficient space to pull the four lines or pipes CP, P1, P2, and P3 from underneath the car floor to the motorman's cab and, additionally, to couple these pipes to the brake valve BV in the motorman's cab.

In addition, the brake system of a modern car often uses the main controller which includes the brake controller having the brake command and release command outputs taking the form of electric signals. Thus, the driver or motorman experiences a different operational response or feeling with this electric command type controller than with the previous existing pneumatic type brake valve BV. Therefore, it used to be a burden for the driver who had to handle both the electrical controller and the brake valve BV in the different command systems.

In addition, since both of the command systems are fundamentally different, it is difficult to utilize the above-mentioned main controller in the electromagnetic direct connecting air brake system.

OBJECTS AND SUMMARY OF THE INVENTION

Therefore, it is an object of this invention to solve the above-mentioned problem in which the conventional brake valve is eliminated, and in place thereof there is provided a brake controller or main controller. The outputs, namely, the brake command and release command signals, are electrical in nature, and are conveniently conveyed to the above-mentioned motorman's cab. There is an electropneumatic pressure convertor which inputs the brake command and release command signals from the controller which outputs the air of a pressure corresponding to these commands underneath the car floor. The output chamber of this electropneumatic pressure convertor is connected to the above-mentioned control line under the floor of the car as well as in the existing electromagnetic direct connecting air brake system.

Using this technique, there is an electropneumatic pressure convertor having its outputs corresponding to air pressure representative of the electric signal underneath the car floor. The output chamber from underneath the car floor of this electropneumatic pressure convertor is connected to the control line. Thus, the electric command type brake controller or the main controller can be used instead of the existing pneumatic type brake valve, so that the burden on the driver can be reduced. At the same time, the layout of the motorman's controls and the connections between the motorman's cab and the underneath of the car floor can be simplified since this electric command type controller is located at the motorman's cab.

In other systems, in the electromagnetic direct connecting controller in particular, the electromagnetic brake valve and the electromagnetic release valve, etc., are the same as those of the prior art systems. Changing the air command type brake valve into the electric command type controller in the electromagnetic direct connecting air brake system is described in FIGS. 2 and 3 of Japanese Pat. No. 53-52723. However, in this latter system, the electric command type controller can be used, but the electromagnetic direct connecting controller must be modified or replaced by a completely different member.

Compared to that, in the embodiment of this invention, the electromagnetic direct connecting controller of the prior art arrangement can be used as is, and this represents an advantage. The electropneumatic pressure convertor, which is added in this invention, can be constructed with several electromagnetic valves and a compound relay valve when the electric command is a digital signal. Conversely, when the electric command is an analog signal, it uses an electropneumatic pressure conversion valve, all of which are designs of the prior art and have a proven record of performance, so that they can be used as they are manufactured.

In accordance with the present invention, there is provided an electromagnetic straight air brake control system comprising, an electrical brake controller located in the cab of a railway vehicle which pressurizes an air brake control line in response to a brake application and which exhausts the air brake control line in response to a release application, an electromagnetic brake application valve located underneath the floor of the railway vehicle for opening and closing a straight air line to a source of air pressure, an electromagnetic release application valve located underneath the floor of the railway vehicle for opening and closing the straight air line to the atmosphere, an electromagnetic straight air controller located beneath the floor of the railway vehicle and which energizes and deenergizes the electromagnetic brake and release application valves based on the pressure difference between the air brake control line and the straight air line, an electrical brake controller produces a brake command output and a release command output in the form of electric signals which are generated in the cab of the railway vehicle, an electropneumatic pressure convertor located underneath the floor of the railway vehicle which receives the brake command and release command outputs from the electrical brake controller and which establishes an air pressure corresponding to the brake command and release command outputs, and an electropneumatic pressure controller having an output chamber which is connected to an air brake control line located underneath the floor of the railway vehicle.

DESCRIPTION OF THE DRAWINGS

The above objects and other attendant features and advantages will be more readily appreciated as the present invention becomes better understood by reference to the following detailed description when considered in conjunction with the accompanying drawings, wherein.

DETAILED DESCRIPTION OF THE INVENTION

Figure 1:
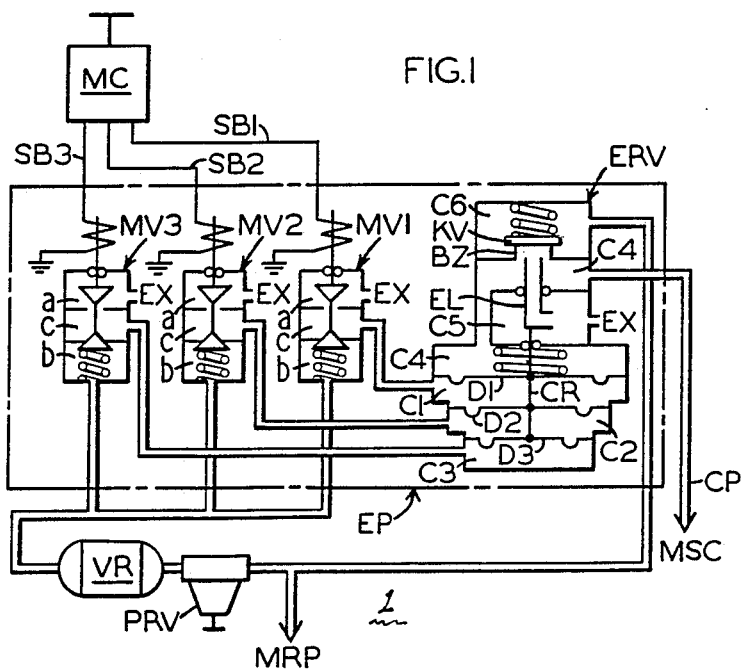
FIG. 1 is a schematic diagram of the main or essential components of one embodiment of an air brake system in accordance with the present invention.
Figure 2:
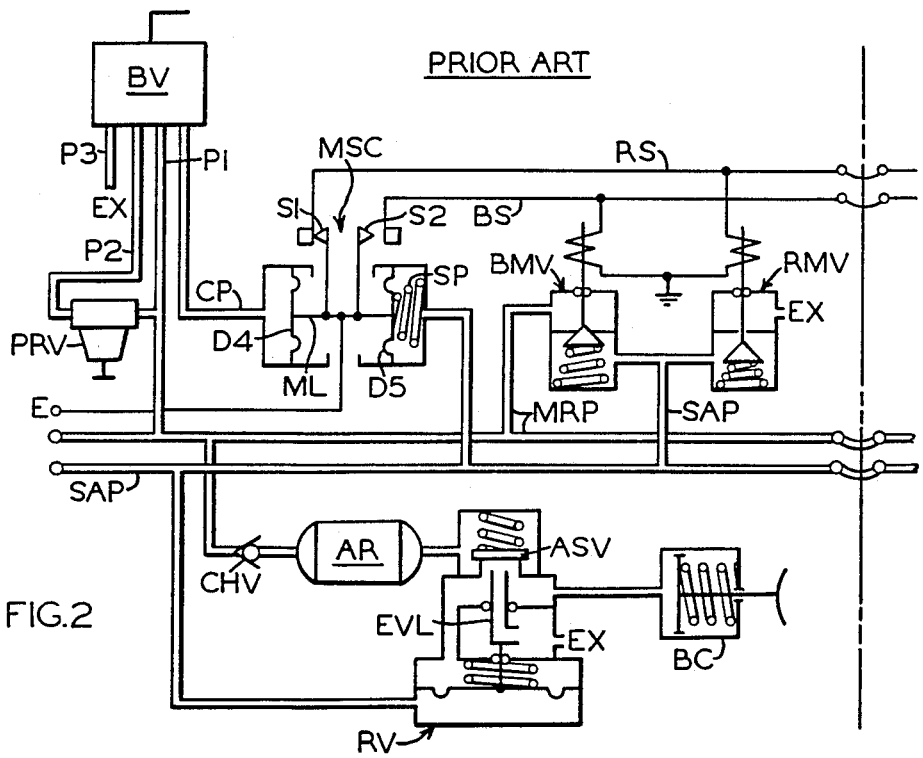
FIG. 2 is a schematic diagram of an air brake system of the prior art.

Referring now to the drawings, and in particular to FIG. 1, there is shown an air brake system for railway cars, generally characterized by numeral 1.

The following is an explanation of one preferred embodiment of this invention based on FIG. 1. Here, FIG. 1 shows only the essential parts, and the other components which are the same as those of the prior art system are omitted for convenience purposes.

In FIG. 1, the main controller MC is common in the prior art and performs the running operation and the brake operation by a single handle and is appropriately installed in the motorman's cab in place of the existing brake valve BV.

The brake command and release command signals from this main controller MC normally consist of a 3-bit digital signal. The signals are transferred into the electropneumatic pressure convertor EP through the car floor via three electrical command lines SB1, SB2, and SB3.

The electropneumatic pressure convertor EP consists of three electromagnetic valves MV1, MV2, MV3, and one compound relay valve ERV which is similar to that shown, for example, in the control part disclosed in examined Japanese Pat. No. 62-33106.

The electromagnetic valves MV1, MV2, and MV3 have substantially identical structures, and each has exhaust chamber a which is opened to the atmosphere via port EX, a first chamber b which is connected to the pressure regulating valve PRV through the volume air reservoir VR and a second chamber c, each of which is connected to each of the respective diaphragm chamber C1, C2, and C3 of a compound relay valve ERV which will be described presently.

In the deenergized condition, as shown in FIG. 1, the valve member of each electromagnetic valve MV1, MV2, and MV3 is moved upwardly by the respective biasing spring, and the second chamber c of each valve is connected to the exhaust chamber a. At the same time, the first chamber b of each valve is blocked off from the second chamber c of each valve. When the valves MV1, MV2, and MV3 are energized, the valve member moves downwardly against the biasing force of the respective springs and the second chamber c is blocked off from the exhaust chamber a. At this time, the first chamber b of each valve is connected to the second chamber c of each valve.

It will be seen that the compound relay valve ERV has a plurality of diaphragm chambers C1, C2 and C3, which are formed by three diaphragms D1, D2 and D3. An output chamber C4 of relay valve ERV, which is formed adjoining the diaphragm chamber C1 via the diaphragm D1, is connected to the control line CP. An exhaust chamber C5 of relay valve ERV, which is formed adjoining the output chamber C4, is opened to the atmosphere. An air supply chamber C6 of relay valve ERV is directly connected to the main air reservoir line MRP.

The three diaphragms D1, D2 and D3 are linked or connected to each other by a common connecting rod CR. The descending order of the ratio of the areas is 7:6:4. A hollow exhaust valve tube EL is connected to the rod CR and, in turn, to the three diaphragms D1, D2, D3. The upper open end of the tube EL passes through the inner opening of the valve seat BZ and is adapted to seat against the air supply valve KV.

The operating sequence of the electropneumatic pressure convertor EP is illustrated in Table 1. Here, notches 1–7 indicate the gradations of the brake command positions of the main controller, which are selected by the motorman. The (0) mark of each electromagnetic valve indicates that it is energized so that air pressure is supplied to the corresponding diaphragm chamber C1–C3. The (−) mark for each electromagnetic valve indicates that it is deenergized so that the corresponding diaphragm chamber C1–C3 is exhausted to atmosphere. The unit of measure of output pressure is Kg/cm$^2$.

TABLE 1

| Notch of Main Controller | Valve MV1 | Valve MV2 | Valve MV3 | Output Pressure Kg/cm$^2$ |
| --- | --- | --- | --- | --- |
| Release | — | — | — | 0 |
| 1 | 0 | — | — | 0.5 |
| 2 | — | 0 | 0 | 1.0 |
| 3 | 0 | 0 | — | 1.5 |
| 4 | — | — | 0 | 2.0 |
| 5 | 0 | — | 0 | 2.5 |
| 6 | — | 0 | 0 | 3.0 |
| 7 | 0 | 0 | 0 | 3.5 |

TABLE 1-continued

The embodiment described above uses the main controller MC; however, the brake controller can also be used independently. If the electrical signal from these controllers is an analog signal, the electropneumatic pressure conversion valve may be of the type shown in FIG. 1 of Japanese Pat. No. 60-31162. It will be appreciated that the electricity-fluid pressure converting valve 3 can be used in place of the electropneumatic pressure convertor EP.

The following is a nomenclature list of components or elements shown and disclosed in the drawings and specification of the subject invention:

| | |
| --- | --- |
| BV | brake valve |
| MC | main controller |
| MV1, MV2, MV3 | electromagnetic valves |
| CP | control line |
| PRV | pressure regulating valve |
| SAP | direct connecting line |
| AR | air reservoir |
| MRP | original air reservoir line (air source) |
| CHV | check valve |
| BMV | electromagnetic brake valve |
| RV | relay valve |
| RMV | electromagnetic release valve |
| MSC | electromagnetic straight air or direct connecting controller |
| VR | volume reservoir |
| EP | electropneumatic pressure convertor |
| ML | movable linkage |
| ERV | compound relay valve |
| P1 | first air supply line |
| P2 | second air supply line |
| P3 | exhaust line |
| C1, C2, C3 | diaphragm chambers |
| C4 | output chamber |
| C5 | exhaust chamber |
| C6 | air supply chamber |
| SB1, SB2, SB3 | electrical command lines |
| S1 | release application contact point |
| S2 | brake application contact point |
| BS | brake command line |
| RS | release command line |
| ASV | air supply valve |
| EVL | exhaust valve rod |
| CR | connecting rod |
| EL | exhaust valve tube |
| BZ | valve seat |
| KV | air supply valve |
| AR | air reservoir |
| BC | brake cylinder |
| SP | return spring |
| D4, D5 | diaphragms |
| BP | brake pipe |
| Ex | exhaust port |
| E | power source |
| a | exhaust chamber |
| b | first chamber |
| c | second chamber |

Thus, the present invention has been described in such full, clear, concise and exact terms as to enable any person skilled in the art to which it pertains to make and use the same, and having set forth the best mode contemplated of carrying out this invention. I state that the subject matter, which I regard as being my invention, is particularly pointed out and distinctly asserted in what is claimed. It will be understood that variations, modifications, equivalents, and substitutions for components of the above specifically described embodiment of the invention may be made by those persons skilled in the art without departing from the spirit and scope of the invention as set forth in the appended claims.

I claim:

1. An electromagnetic straight air brake control system comprising, a main brake controller located in the cab of a railway vehicle having a plurality of notch positions for producing a digital brake command signal in response to a brake application and for producing a digital release command signal in response to a release application, an electropneumatic pressure convertor located underneath the floor of the railway vehicle, said electropneumatic pressure converter including a plurality of electromagnetic valves which are energized and deenergized by said digital brake and release command signals, each of said plurality of electromagnetic valves having an exhaust chamber, a first chamber, and a second chamber, said electropneumatic pressure convertor including a compound relay valve, said compound relay valve including a plurality of diaphragm chambers connected to said second chamber of respective ones of said plurality of electromagnetic valves, a pressure regulating valve and a volume air reservoir connected to said first chamber of said plurality of electromagnetic valves, said compound relay having a supply chamber connected to a main air reservoir and an output chamber connected to a control line in which the pressure is dependent upon the notch position of said main brake controller.

2. The electromagnetic straight air brake control system, as defined in claim 1, wherein each of said electromagnetic valves is spring-biased to open said second chamber to said exhaust chamber.

3. The electromagnetic straight air brake control system, as defined in claim 1, wherein said first chamber is opened to said second chamber when each of said electromagnetic valves is energized.

4. The electromagnetic straight air brake control system, as defined in claim 1, wherein each of the digital brake and release command signals is a 3-bit signal.

* * * * *

UNITED STATES PATENT AND TRADEMARK OFFICE
CERTIFICATE OF CORRECTION

PATENT NO. : 4,865,394
DATED : September 12, 1989
INVENTOR(S) : Hiroshi Nishii

It is certified that error appears in the above-identified patent and that said Letters Patent is hereby corrected as shown below:

Column 8, line 5, after "relay" insert --valve--

Signed and Sealed this

Twenty-fourth Day of July, 1990

Attest:

HARRY F. MANBECK, JR.

*Attesting Officer*  *Commissioner of Patents and Trademarks*